United States Patent [19]

Duncan et al.

[11] Patent Number: 4,669,183
[45] Date of Patent: Jun. 2, 1987

[54] METHOD AND APPARATUS FOR SIZING GALVANIC CELL SEPARATORS

[75] Inventors: Wooten E. Duncan, Opelika, Ala.; Dwight Townsend, La Grange, Ga.

[73] Assignee: Duracell Inc., Bethel, Conn.

[21] Appl. No.: 849,974

[22] Filed: Apr. 10, 1986

[51] Int. Cl.⁴ .............................................. H01M 2/14
[52] U.S. Cl. .................................. 29/623.1; 429/139; 156/308.2
[58] Field of Search ............................ 29/623.1, 623.4; 156/308.2, 293; 429/133, 131, 136, 139, 140; 219/243

[56] References Cited

U.S. PATENT DOCUMENTS

| | | | |
|---|---|---|---|
| 1,654,038 | 12/1927 | Deibel | 429/133 |
| 3,089,914 | 5/1963 | Carmichael et al. | 429/144 X |
| 3,338,142 | 8/1967 | Simpson et al. | 156/218 X |
| 4,215,186 | 7/1980 | Jaeger | 429/139 |
| 4,390,384 | 6/1983 | Turner | 29/623.1 |

Primary Examiner—Anthony Skapars
Attorney, Agent, or Firm—Ronald S. Cornell

[57] ABSTRACT

The present invention relates to an improved method for sizing thermoplastic battery separators introduced into partially assembled cells. The method comprises introducing a heated sizing punch under controlled temperature and time conditions to deform the formed thermoplastic separator and to seal its seams without degrading the separator material.

4 Claims, 5 Drawing Figures

METHOD AND APPARATUS FOR SIZING GALVANIC CELL SEPARATORS

BACKGROUND OF THE INVENTION

Although manufacturers of galvanic cells for many years have attempted to produce a better cell having longer life, higher current drains and greater outputs by improving upon one or more elements of the cell, one area that has continued to be less than totally satisfactory has been the construction of the separator used in the galvanic cell.

In conventional alkaline type $MnO_2$ dry cells, the cell construction generally consists of a metal container, suitably of steel, a mass or mix of $MnO_2$ and graphite molded within the steel case, a separator adjacent to the $MnO_2$ mass and an electrolyte and anode material in the center of the separator. The separator serves both as a barrier against migration of the depolarizer mix and the anode. In the past, it has been found convenient and practical to employ a cellulose based separator such as one constructed of paper, pulpboard, alpha cellulose, cellulose acetate, pasted kraft board, methyl celluose film and non-woven paper of cellulose fibers laminated to a similar mat of vinyl fibers. More recently, polyvinyl acetate sheeting has been employed as a separator material for its ability to prevent migration of depolarizer and to provide dimensional stability.

Conventionally, separators have been made by wrapping the separator around the sides of a bobbin and by folding the separator across the bottom of the bobbin before it is inserted within the cell. Usually, one or more washers were employed at the bottom of the bobbin to lock the folded edges of the separator against the bottom of the cell. However, separators of this construction suffer from many disadvantages. These separators, because they are wrapped around the bobbin before it is inserted within the cell, tend to loosen. As the separator must be tight to contain the particles of depolarizer mix, migration of these particles is likely to occur. Another disadvantage is that the folded bottom of the separator, even when washers are used to lock the folded edges are bulky and take up space within the cell.

To provide more room within the cell, the prior art developed a method of forming a separator by forcing a strip of separator material through a die with a punch and inserting the formed separator into the cell container which is mounted to the forming die. One such method is described in U.S. Pat. No. 3, 089,914 to Carmichael et al.

Although such prior art procedures provided reasonably satisfactory results with paper separators, it has been found that when the separators are constructed of relatively stiff, resilient materials, the separator walls, due to the resiliency of the material employed, tend to contract or coil inwardly toward the center of the cell thereby reducing the size of the opening into which the anode material is poured during the filling operation. This results in serious problems in high speed assembly of alkaline cells as the narrowed orifice reduces the free space available for anode material thereby providing a cell with a shortened life and frequently causes spill over of anode material onto the cathode with a resulting shorting and rejection of the cell.

It is therefore an object of the present invention to provide an improved separator construction for a galvanic cell.

Another object is to provide a method and apparatus for forming the separator in place within the shell of the galvanic cell.

SUMMARY OF THE INVENTION

According to the present invention, there is now provided an improved method of separator construction for a galvanic cell having at least two cup shaped separator linings, each of which consists of a circular bottom and cylindrical side walls composed of two overlapping semi-cylindrical wall segment and which comprises employing a thermoplastic separator material which, upon formation into a separator, is sized within the cell with a sizing punch at a temperature and for a period of time sufficient to deform the thermoplastic material against the cathode material and to fuse its seams without degrading the mechanical integrity and the migration resistance and insulating properties of the separator.

DETAILED DESCRIPTION OF THE INVENTION

Figure 1:
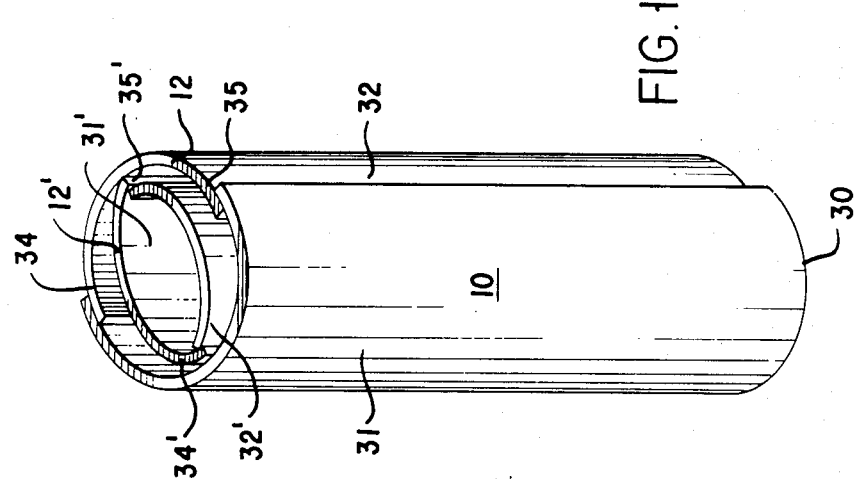
FIG. 1 is an exploded view of the separator construction of the invention prior to sizing.

Referring to the drawings, there is shown in FIG. 1 an exploded view of a separator construction according to the invention which comprises an outer and an inner cupped shaped separator lining 12, 12', preferably of a thermoplastic material such as polyvinyl acetate. The separator linings 12, 12' are formed one inside the other and then placed within the case of a galvanic cell such as the cell shown in FIG. 3.

Figure 3:
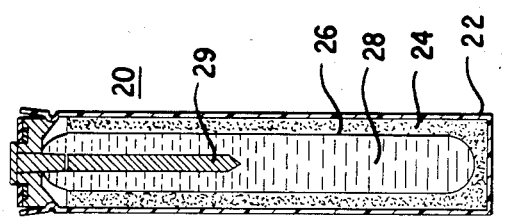
FIG. 3 is a sectional view of a typical cell embodying the invention.

As shown in FIG. 3, an alkaline cell 20 of the type of construction for which the invention is well suited typically comprises a steel case 22 which serves as the container for the cell, a cathode 24 consisting of $MnO_2$, a separator 26, an anode 28 containing KOH and amalgamated zinc and an anode conductor tip 29.

According to the present invention, an alkaline cell such as is shown in FIG. 3 may be provided with a separator construction 10 comprising an outer and an inner cupped shaped separator lining 12, 12', preferably of polyvinyl acetate, which are formed in place within the metal shell containing the pre-formed cathode material.

Figure 2:
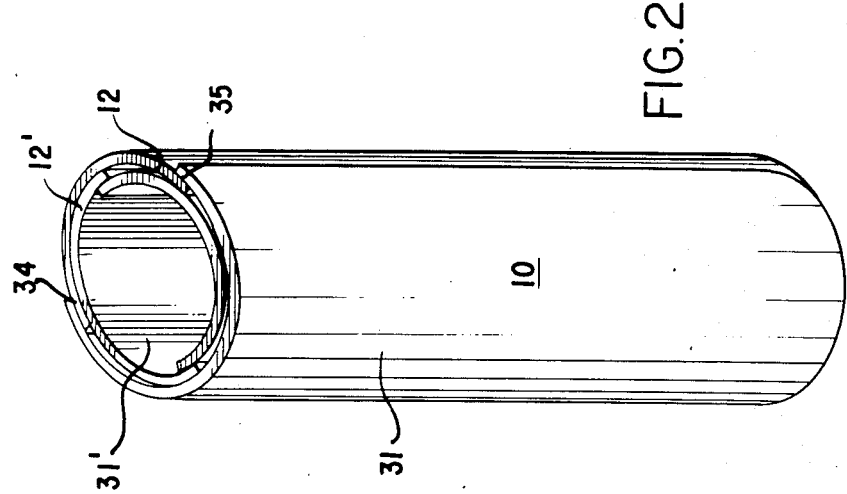
FIG. 2 is an exploded view of the separator construction of the invention after sizing.

The separator linings 12,12', referring again to FIG. 1, are each formed from a single blank of separator material and comprise a circular bottom, shown at 30 and cylindrical side walls composed of two semi-cylindrical wall segments 31,32 and 31',32' having overlapping edges 34,35 and 34',35' respectively. The excess separator material at the bottom edge of each separator linings 12,12' is gathered neatly into folded tabs 36 which are folded against the cylindrical side walls. The tabs 36 of the separator linings 12,12' are intended to prevent the overlapping lateral edges 34,35 and 34',35' from separating but because of the stiffness of the thermoplastic separator material, do not lie compactly against the side walls. The fusing of the thermoplastic separator material permits the formation of a hemispherical bottom with the tabs sealed tightly to the cylindrical side walls of the separator linings as is shown in FIG. 2. The lateral ovelapping edges 34,35 and 34′,35′ of each separator lining 12,12′, respectively, occupy spaced radial positions about the circumference of the cylindrical side walls of the separator construction. The overlapped edges are heat sealed by action of the heated punch 40, thus providing increased anode volume and preventing migration of particles of depolarizer mix and anode material through the overlapping lateral edges 34′,35′ of the inner separator lining 10′

Figure 5:
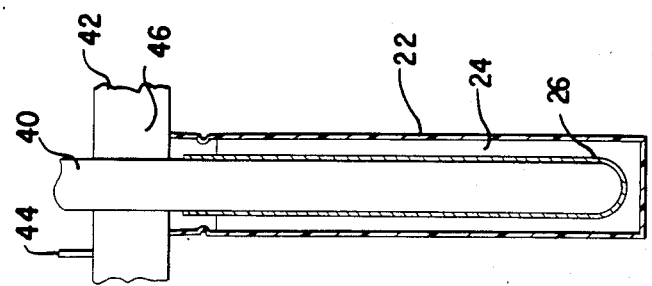
FIG. 5 is a vertical sectional view of the punch apparatus showing the punch in position within the separator in the cell.
Figure 4:
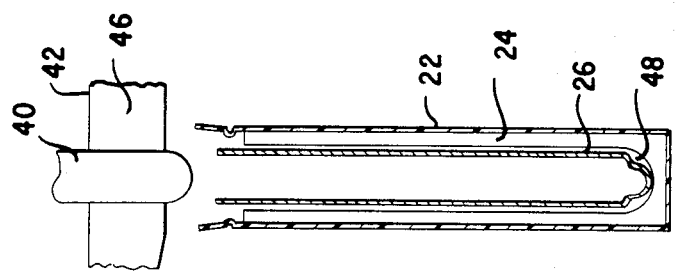
FIG. 4 is a vertical sectional view of the punch apparatus before insertion into the separator.

Apparatus for carrying out the method shown in FIGS. 4 and 5 comprises a cylindrical heated resize punch 40, a heater block 42. The resize punch is heated in the heater block, the temperature being controlled by thermocouple 44.

As will be seen in FIG. 4, heated resize punch 40 is axially positioned within an axial bore located in heater block 42 which consists of a brass body 46 surrounded by a heater band of conventional design (not shown) connected to a source of electrical power. Heated punch 40 is moved along its axis by a stroke control air cylinder (not shown) which raises and lowers the punch. As the separator and cathode cell assembly is indexed below heated punch 40, a controller (not shown) signals a pneumatic system to cycle the punch in and out of the cell assembly. The heated punch, depending on the assembly line configuration, may be assembled in multiples, preferably multiples containing four heated punches per station.

It has been found that when heated punch 40 is provided with a hemispherical bottom, the bottom of the separator conforms tightly to the bottom of the preformed cathode cavity 48 and minimizes bulges in the folds with their resultant waste of space.

In carrying out the method of the present invention, the separator lining 12, 12′ is formed by methods well known in the art and the formed separator is inserted into the cell shell. The heated punch 40 is lowered from heater block 42 into the center cavity formed by the cylindrical walls of separator 12,12′, forcing the side walls and bottom of the separator construction tightly against the preformed cathode. Heated punch 40 is maintained at a temperature and for a time sufficient to deform the thermoplastic separator without degrading it. Where polyvinyl acetate is the separator material employed, the heated punch will be maintained at a temperature of below about 180° F., preferably at a temperature of about 135° F. to about 160° F. and most preferably at a temperature of about 141° F. The length of time heat punched 40 remains in in contact with the separator material will vary with the composition of the thermoplastic material and the temperature of the punch. However, in all cases the time and temperature must be such as to avoid degradation of the separator material. Where polyvinyl acetate is employed, the time the heated punch is kept in contact with the separator will be less than 0.2 seconds and preferably less than 0.1 seconds.

It will be apparent that the length and diameter of the heated punch may vary, depending on the diameter and length of the cell in which the separator material is to be sized.

What is claimed is:

1. In a method for forming alkaline batteries wherein a cathode is insulated and separated from the anode material by means of a separator, the improvement which comprises inserting a formed separator having a central cavity and being constructed of thermoplastic material into a partially assembled cell consisting of the casing and the cathode material, inserting a heated sizing punch into said central cavity of said separator construction, maintaining said heated punch in said cavity for a period of time and at a temperature sufficient to deform said thermoplastic material and to fuse the seams of said separator without degrading the mechanical integrity and insulating and barrier properties of said separator material and removing said heated sizing punch from said sized separator.

2. The method according to claim 1 wherein the thermoplastic separator material is derived from a thermoplastic sheet material, the major portion of which is polyvinyl acetate.

3. The method according to claim 2 wherein a sizing punch maintained at a temperature below about 180° F. is inserted into said formed separator material and maintained therein for less than about 0.1 seconds thereby sizing said separator against said preformed cathode and sealing the side seams and bottom of said separator.

4. The method according to claim 2 wherein a sizing punch maintained at a temperature of about 135° to about 160° F. is inserted into said formed separator material for less than about 0.1 seconds thereby sizing said separator against said preformed cathode and sealing the side seams and bottom of said separator.

* * * * *